(12) United States Patent
Kobayashi et al.

(10) Patent No.: US 11,406,892 B2
(45) Date of Patent: Aug. 9, 2022

(54) INFORMATION PROCESSING APPARATUS

(71) Applicant: Sony Interactive Entertainment Inc., Tokyo (JP)

(72) Inventors: Ikuo Kobayashi, Tokyo (JP); Toshimasa Aoki, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/691,778

(22) Filed: Nov. 22, 2019

(65) Prior Publication Data
US 2020/0171378 A1 Jun. 4, 2020

Related U.S. Application Data

(60) Provisional application No. 62/774,912, filed on Dec. 4, 2018.

(51) Int. Cl.
*A63F 13/2145* (2014.01)
*A63F 13/24* (2014.01)
*A63F 13/23* (2014.01)

(52) U.S. Cl.
CPC .......... *A63F 13/2145* (2014.09); *A63F 13/23* (2014.09); *A63F 13/24* (2014.09)

(58) Field of Classification Search
CPC .... A63F 13/214; A63F 13/2145; A63F 13/23; A63F 13/24; A63F 13/426
(Continued)

(56) References Cited

U.S. PATENT DOCUMENTS 8,875,046 B2 10/2014 Jitkoff
9,930,160 B2 3/2018 Shuttleworth
(Continued)

FOREIGN PATENT DOCUMENTS

CN 102968183 A * 3/2013 ............. A63F 13/24
JP 2011036425 A 2/2011
(Continued)

OTHER PUBLICATIONS

Notice of Reasons for Rejection for Japanese Patent Application No. 2019-214345, 6 pages, dated Dec. 22, 2020.
(Continued)

*Primary Examiner* — Kwin Xie
(74) *Attorney, Agent, or Firm* — Matthew B. Dernier, Esq.

(57) ABSTRACT

An information processing apparatus connected to a manipulation device including manipulation members, the apparatus including: a main program executing section executing a main program to display a main screen image; a sub-program executing section executing a sub-program around the same time as the main program to display a sub-screen image together with the main screen image; and a manipulation receiving section switching an operation mode in which a manipulation by a user for predetermined some manipulation members of the manipulation members is received as a manipulation for the main program, and an operation mode in which a manipulation by the user for the predetermined some manipulation members is received as a manipulation for the sub-program and in which a manipulation for a manipulation member different from the predetermined some manipulation members is received as a manipulation for the main program over to each other according to a given manipulation.

7 Claims, 10 Drawing Sheets

(58) Field of Classification Search
USPC .................................................. 345/156–169
See application file for complete search history.

(56) References Cited

U.S. PATENT DOCUMENTS

| | | | |
|---|---|---|---|
| 10,642,486 B2 | 5/2020 | Iida | |
| 2009/0298585 A1* | 12/2009 | Cannon | A63F 13/26 463/31 |
| 2012/0026166 A1* | 2/2012 | Takeda | A63F 13/06 345/419 |
| 2012/0127071 A1 | 5/2012 | Jitkoff | |
| 2014/0189523 A1 | 7/2014 | Shuttleworth | |
| 2015/0057081 A1* | 2/2015 | Kelly | A63F 13/426 463/31 |
| 2015/0095828 A1 | 4/2015 | Iida | |
| 2015/0256895 A1* | 9/2015 | Young | H04L 67/025 725/37 |
| 2016/0291865 A1* | 10/2016 | Kwak | G06F 3/013 |
| 2017/0097413 A1* | 4/2017 | Gillian | G01S 7/415 |
| 2017/0209786 A1* | 7/2017 | Zhu | A63F 13/323 |

FOREIGN PATENT DOCUMENTS

| | | |
|---|---|---|
| JP | 2013235344 A | 11/2013 |
| JP | 2016511854 A | 4/2016 |
| JP | 2017199420 A | 11/2017 |

OTHER PUBLICATIONS

Notice of Reasons for Final Rejection for Japanese Patent Application No. 2019-214345, 4 pages, dated Apr. 6, 2021.

* cited by examiner

FIG. 10

INFORMATION PROCESSING APPARATUS

CROSS REFERENCE TO RELATED APPLICATIONS

This application claims the benefit of U.S. Provisional Patent Application No. 62/774,912, accorded a filing date of Dec. 4, 2018, the entire disclosure of which is hereby incorporated by reference.

BACKGROUND

The present disclosure relates to an information processing apparatus receiving a manipulation input from a user, an information processing method, and a program.

An information processing apparatus executes a plurality of programs around the same time in parallel in some cases. In such a case, a user, for example, performs a manipulation input to each of programs while he/she switches the program set as a manipulation target over to another program by performing a predetermined switching manipulation.

SUMMARY

When the switching manipulation is performed, it becomes impossible to perform the manipulation input to the program for which the manipulation has been performed until then. However, for example, in the case where a game problem is executed and the game is being played, and so on, it is undesirable that it becomes impossible to perform a manipulation input to the program of interest at all in some cases.

The present disclosure has been made in consideration of the actual circumstances described above, and there is provided an information processing apparatus which allows a user to easily perform a manipulation input to programs which are executed in parallel, an information processing method, and a program.

An information processing apparatus according to one aspect of the present disclosure is connected to a manipulation device including a plurality of manipulation members. The information processing apparatus includes: a main program executing section executing a main program to display a main screen image; a sub-program executing section executing a sub-program around the same time as the main program to display a sub-screen image together with the main screen image; and a manipulation receiving section switching an operation mode in which a manipulation by a user for predetermined some manipulation members of the plurality of manipulation members is received as a manipulation for the main program, and an operation mode in which a manipulation by the user for the predetermined some manipulation members is received as a manipulation for the sub-program and in which a manipulation for a manipulation member different from the predetermined some manipulation members is received as a manipulation for the main program over to each other according to a given manipulation.

An information processing method according to the one aspect of the present disclosure is an information processing method which is executed by a computer connected to a manipulation device including a plurality of manipulation members. The information processing method includes: executing a main program to display a main screen image; executing a sub-program around the same time as the main program to display a sub-screen image together with the main screen image; and switching an operation mode in which a manipulation by a user for predetermined some manipulation members of the plurality of manipulation members is received as a manipulation for the main program, and an operation mode in which a manipulation by the user for the predetermined some manipulation members is received as a manipulation for the sub-program and in which a manipulation for a manipulation member different from the predetermined some manipulation members is received as a manipulation for the main program over to each other according to a given manipulation.

A program according to the one aspect of the present disclosure is a program for a computer connected to a manipulation device including a plurality of manipulation members, including: by a main program executing section, executing a main program to display a main screen image; by a sub-program executing section, executing a sub-program around the same time as the main program to display a sub-screen image together with the main screen image; and by a manipulation receiving section, switching an operation mode in which a manipulation by a user for predetermined some manipulation members of the plurality of manipulation members is received as a manipulation for the main program, and an operation mode in which, in a state in which the sub-screen image is displayed, a manipulation by the user for the predetermined some manipulation members is received as a manipulation for the sub-program and in which a manipulation for a manipulation member different from the predetermined some manipulation members is received as a manipulation for the main program over to each other according to a given manipulation.

DETAILED DESCRIPTION OF THE PREFERRED EMBODIMENT

Hereinafter, an embodiment of the present disclosure will be described in detail on the basis of the drawings.

Figure 1:
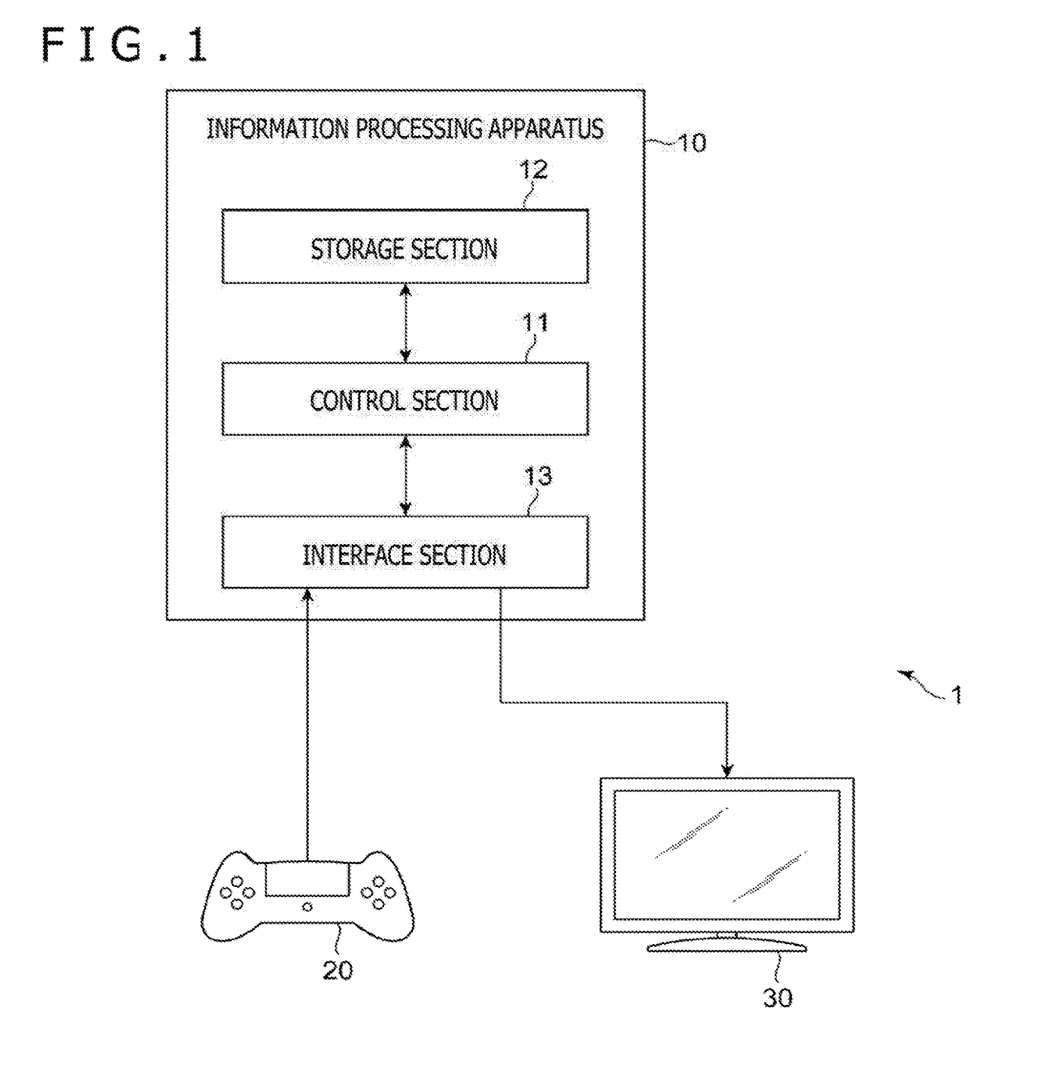
FIG. 1 is a configuration block diagram of an information processing system including an information processing apparatus according to an embodiment of the present disclosure.

FIG. 1 is a configuration block diagram depicting an overview of an information processing system 1 including an information processing apparatus 10 according to an embodiment of the present disclosure. As depicted in the figure, the information processing system 1 includes the information processing apparatus 10, a manipulation device 20, and a display apparatus 30.

The information processing apparatus 10 may, for example, be a home video game console, a personal computer or the like. As depicted in FIG. 1, the information processing apparatus 10 includes a control section 11, a storage section 12, and an interface section 13.

The control section 11 includes at least one processor such as a central processing unit (CPU), and executes a program stored in the storage section 12 to execute various kinds of information processing. It is to be noted that in the embodiment, a concrete example of the processing executed by the control section 11 will be described later. The storage section 12 includes at least one memory device such as a random access memory (RAM), and stores the program which is to be executed by the control section 11, and data which is to be processed by the program of interest.

The interface section 13 is an interface for data communication between the manipulation device 20 and the display apparatus 30. The information processing apparatus 10 is connected to the manipulation device 20 and the display apparatus 30 via the interface section 13 in any of a wired or wireless manner. Specifically, in order to transmit video data supplied from the information processing apparatus 10 to the display apparatus 30, the interface section 13 shall include a multimedia interface such as a high-definition multimedia interface (HDMI)®. In addition, in order to receive a manipulation signal indicating manipulation contents by the user received by the manipulation device 20, the interface section 13 includes a data communication interface such as a universal serial bus (USB).

Figure 2:
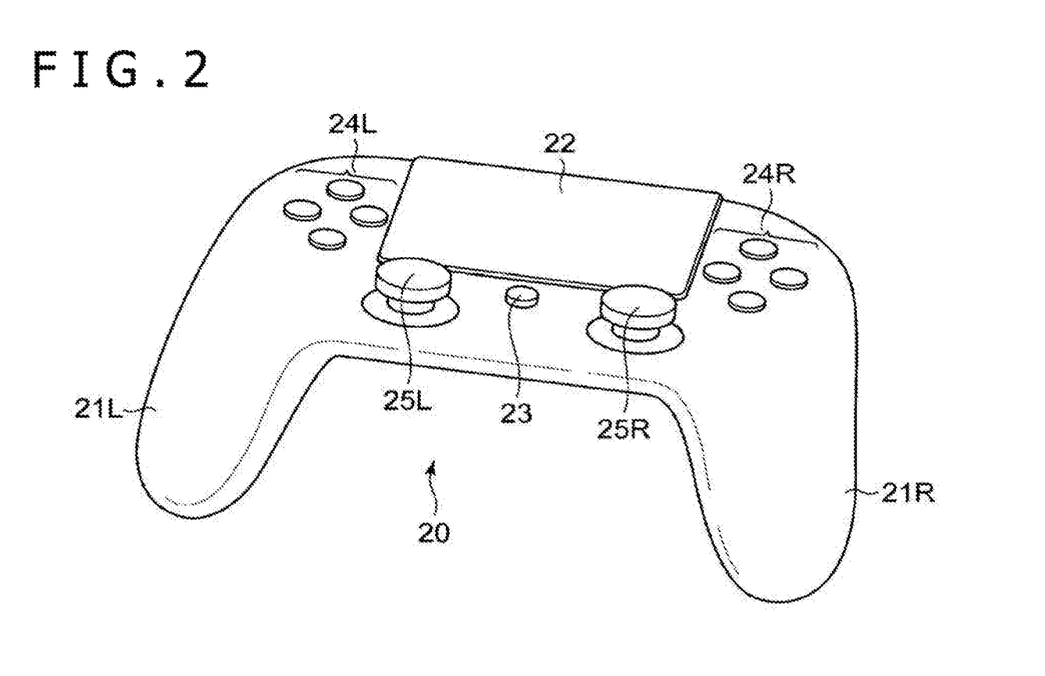
FIG. 2 is a view depicting an example of appearance of a manipulation device.

The manipulation device 20 is a device for receiving the manipulation input by the user. FIG. 2 depicts an example of appearance of the manipulation device 20. In the embodiment, it is supposed that the user grips and uses the manipulation device 20 with both the hands, and grip sections 21R and 21L are respectively formed on left and right sides of a main body of the manipulation device 20. The user uses the manipulation device 20 in a state in which the grip section 21R is gripped with the fingers of the right hand, and the grip section 21L is gripped with the fingers of the left hand.

Various kinds of manipulation members by which the user performs the manipulation with the thumb of the user are arranged on an upper surface of the manipulation device 20. Specifically, a touch pad 22 is arranged on a back side of the upper surface of the manipulation device 20 when viewed from the user. Incidentally, in the embodiment, it is supposed that the user performs the manipulation for the touch pad 22 with his/her thumb. A function button 23 for requesting a specific function is arranged on the near side of the upper surface of the manipulation device 20. The user can manipulate the touch pad 22 and the function button 23 with any of the left and right thumbs in a state in which the user grips the manipulation device 20 with both the hands. In addition, a plurality of manipulation buttons 24R by which the user performs a push manipulation with the thumb of his/her right hand, and an analog stick 25R by which the user performs a tilting manipulation with the thumb of his/her right hand are arranged on the right side of the touch pad 22. Likewise, a plurality of manipulation buttons 24L by which the user performs the push manipulation with the thumb of his/her left hand, and the analog stick 25L by which the user performs the tilting manipulation with the thumb of his/her left hand are arranged on the left side of the touch pad 22. It is to be noted that the present disclosure is not limited to the manipulation members described so far, and various kinds of manipulation members which the user can manipulate may be arranged in the manipulation device 20.

The touch pad 22 is a sensor device which includes a planar detection area, and, in the case where an object such as a finger of the user or a stylus exists on the detection area, detects and outputs a position of the object. It is to be noted that the touch pad 22 does not necessarily have the flat plate shape. In the embodiment, the touch pad 22 has a portion which curves to the inner side when viewed from the user and is directed to the back surface side. The user can perform various kinds of manipulations such as a tap manipulation, a flick manipulation, and a slide manipulation for the touch pad 22 with his/her thumb. The tap manipulation is a manipulation with which the user causes the thumb to contact an arbitrary position within the detection area for a short time. The flick manipulation is a manipulation with which the user causes the finger to slide quickly toward a specific direction on the detection area for a relatively short time. The flick manipulation is used to instruct a direction by the user. The slide manipulation is a manipulation with which the user moves the thumb with the thumb contacting the detection area by taking a longer time than that in the flick manipulation.

Further, in the embodiment, it is supposed that the manipulation with which the whole detection area of the touch pad 22 can be compressed from the upper side can be performed for the touch pad 22. In other words, the touch pad 22 also functions as a push button. In the following, the manipulation with which the user compresses the whole touch pad 22 is referred to as a click manipulation.

The display apparatus 30 displays a video according to a video signal transmitted from the information processing apparatus 10 and causes the user to browse the video. The display apparatus 30 may be a home television receiver or the like. In addition, the display apparatus 30 may also be a head-mounted display which is mounted on the user's head and used in this state.

Figure 3:
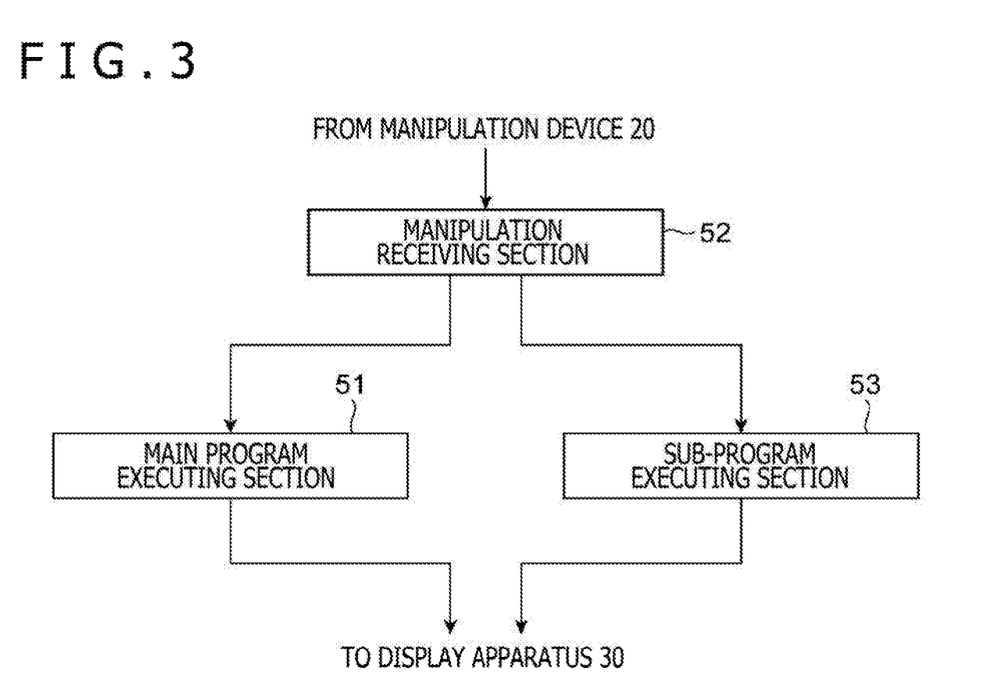
FIG. 3 is a functional block diagram of an information processing apparatus.

Next, a description will be given with respect to functions which the information processing apparatus 10 realizes with reference to FIG. 3. As depicted in FIG. 3, the information processing apparatus 10 functionally includes a main program executing section 51, a manipulation receiving section 52, and a sub-program executing section 53. The control section 11 executes a program stored in the storage section 12, thereby realizing these functions. The program may be provided to the information processing apparatus 10 via a communication network such as the Internet, or may be stored in a computer readable information storage medium such as an optical disc and provided.

The control section 11 executes an application program, thereby realizing the main program executing section 51. In the following, the application program executed by the main program executing section 51 is referred to as a main program. Although the main program may be an application program which realizes various kinds of processing, in the following, the main program shall be a game program as a concrete example. The main program executing section 51 executes various kinds of information processing according to contents of a manipulation input to the manipulation device 20 by the user, and causes the display apparatus 30 to display the execution result on the screen of the display apparatus 30. In the following, the screen image which is displayed on the display apparatus 30 by the main program executing section 51 is described as a main screen image M. In the embodiment, normally, the main screen image M shall be displayed so as to occupy the whole display area of the display apparatus 30.

The manipulation receiving section 52 receives the manipulation input to the manipulation device 20 by the user, and outputs the received contents either to the main program executing section 51 or to the sub-program executing section 53. The manipulation receiving section 52 shall be realized by a system program such as a device driver program independent of the main program. In the embodiment, the information processing apparatus 10 shall operate in any of at least two kinds of operation modes, a main screen image mode and a sub-screen image mode, and the manipulation receiving section 52 shall change an output destination of the contents of the manipulation by the user for a predetermined manipulation member according to the current operation mode. It is to be noted that the contents of the manipulation of an instruction to switch the main screen image mode over to the sub-screen image mode by the user will be described later.

The main screen image mode is a mode in which the manipulation for the main program which displays exclusively the main screen image M is received. In the main screen image mode, the manipulation receiving section 52 regards the manipulation inputs by the user to the manipulation members which the manipulation device 20 includes as a manipulation for the main program (hereinafter referred to as a game manipulation) with some exceptions previously determined, and outputs the manipulation contents to the main program executing section 51. Thereby, in the main screen image mode, the user can perform all the manipulations which the main program can receive by using the manipulation members provided in the manipulation device 20.

In contrast to this, the sub-screen image mode is an operation mode in which the manipulation by the user to a sub-screen image S which will be described later can be received. In the sub-screen image mode, the manipulation receiving section 52 regards the manipulation inputs to the predetermined some manipulation members of the manipulation members which the manipulation device 20 includes as the manipulation for the sub-screen image S, and outputs the manipulation contents to the sub-program executing section 53. On the other hand, with respect to the manipulation inputs to the manipulation members other than the predetermined some manipulation members, the manipulation receiving section 52 regards the manipulation of interest as the manipulation for the main program similarly to the case of the main screen image mode, and outputs the manipulation contents to the main program executing section 51. In the following, the predetermined manipulation member which receives the manipulation for the sub-screen image S shall be a touch pad 22. Hereby, although in the sub-screen image mode, it is limited for the user to use the touch pad 22 in the game manipulation, he/she can continue to perform the game manipulation by using the manipulation member such as the manipulation button 24 or the analog stick 25 other than the touch pad 22. At the same time, the user can also perform the manipulation for the sub-screen image S by using the touch pad 22.

The sub-program executing section 53 draws the sub-screen image S and causes the display apparatus 30 to display the sub-screen image S. The sub-program executing section 53 is realized by a sub-program different from the main program which the main program executing section 51 executes. The sub-program may be a part of a system program. While the main program is executed, the sub-program executing section 53 executes the sub-program in parallel around the same time as the main program, and displays the sub-screen image S together with the main screen image M. The sub-screen image S presents various kinds of information, the menu item becoming a selection target by the user, and the like to the user. In the embodiment, the sub-screen image S occupies a limited partial area of the display area of the display apparatus 30, and is displayed so as to be superimposed on a part of the main screen image M displayed by the main program executing section 51. In addition, the display of the sub-screen image S shall be started at a timing at which the switching from the main screen image mode over to the sub-screen image mode is performed. Further, in the sub-screen image mode, the sub-program executing section 53 updates the display contents of the sub-screen image S according to the contents of the manipulation for the touch pad 22 by the user.

Hereinafter, a description will be given with respect to a concrete example of the manipulation, by the user for the sub-screen image S, which is realized by the manipulation receiving section 52 and the sub-program executing section 53.

Figure 4:
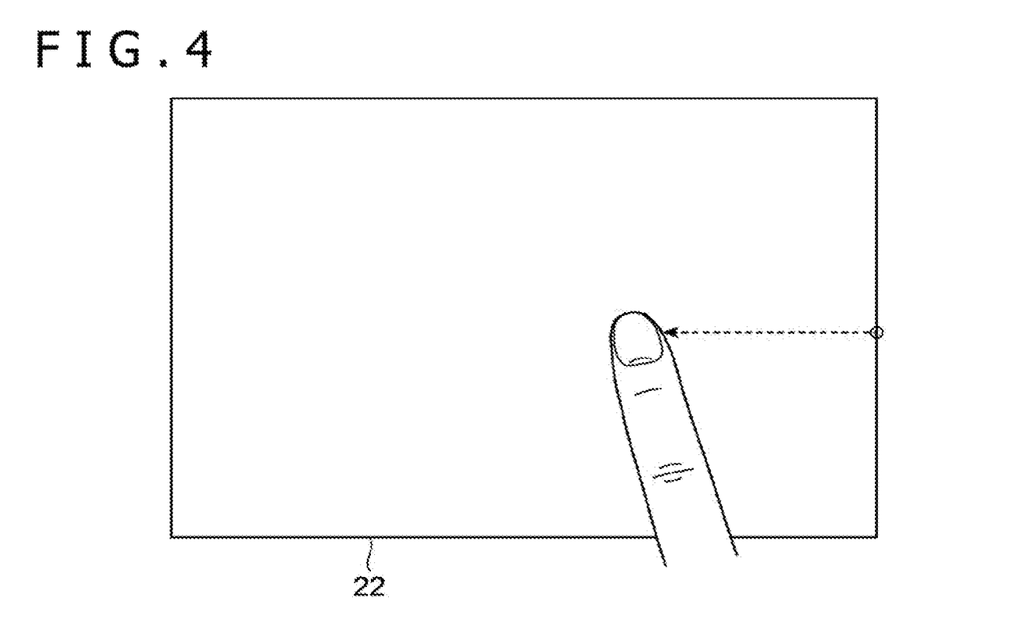
FIG. 4 is a view depicting an example of a sub-screen image mode starting manipulation.

Firstly, a description will be given with respect to a concrete example of a manipulation with which the switching is performed from the main screen image mode over to the sub-screen image mode (hereinafter, referred to as a sub-screen image mode starting manipulation). In the case where the flick manipulation starting from an outer edge (outer circumference) of the detection area of the touch pad 22 toward the central direction is received from the user, the manipulation receiving section 52 performs the switching from the main screen image mode over to the sub-screen image mode, and notifies the sub-program executing section 53 of the effect. FIG. 4 is a view schematically depicting an example of such a sub-screen image mode starting manipulation, and an arrow of a broken line indicates a locus of movement of a finger of the user for the touch pad 22. In general, it is supposed that when the user performs the slide manipulation or the flick manipulation for the touch pad 22, he/she performs such a manipulation with any of the positions in the inside of the detection area as a starting point, and does not perform the flick manipulation from the outer edge. Then, the flick manipulation with the outer edge as the starting point is allocated to the sub-screen image mode starting manipulation, thereby preventing the game manipulation by the user from being disturbed. In the main screen image mode, the user can instruct the information processing apparatus 10 to perform the switching over to the sub-screen image mode by performing the flick manipulation with the outer edge of the detection area as the starting point while he/she performs the slide manipulation, the flick manipulation or the like with the inside of the detection area as the starting point for the touch pad 22 as the game manipulation as usual.

It is to be noted that the manipulation receiving section 52 may receive the flick manipulation with an arbitrary position of the outer edge of the detection area of the touch pad 22 as the starting point as the sub-screen image mode starting manipulation. Alternatively, the manipulation receiving section 52 may receive only the flick manipulation with a position on a specific side as the starting point as the sub-screen image mode starting manipulation. For example, the manipulation receiving section 52 may receive the flick manipulation performed from one point on the left side of the touch pad 22 toward the right direction, and/or the flick manipulation performed from one point on the right side of the touch pad 22 toward the left direction as the sub-screen image mode starting manipulation. In this case, the flick manipulation with the side (the upper side or the lower side) which does not become a target of the sub-screen image mode starting manipulation as the starting point may be outputted as the manipulation for the main program to the main program executing section 51.

Figure 5:
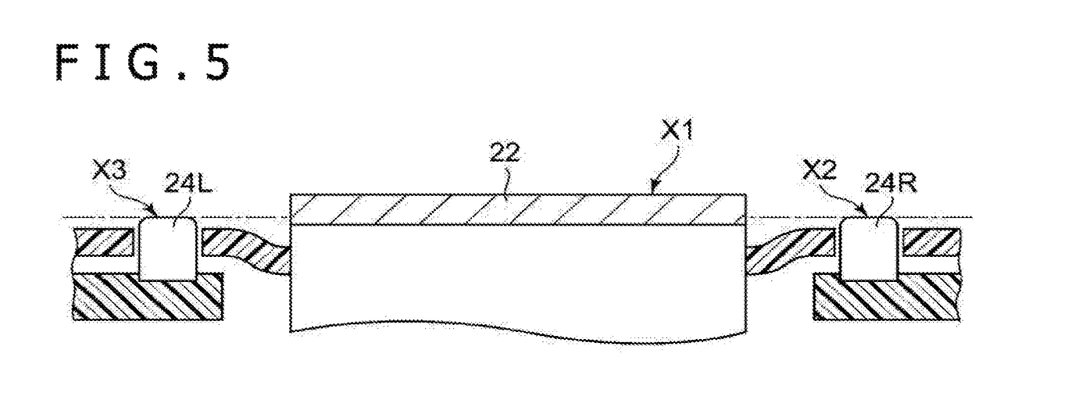
FIG. 5 is a view depicting an example of a position of a detection surface of a touch pad.

In order to enable such a flick manipulation with the outer edge of the touch pad 22 to be reliably performed, in the embodiment, the touch pad 22 may be arranged so as to have the height equal to or higher than that of an upper surface of the manipulation buttons 24R, 24L or the like to which the detection surface (the surface of the detection area) is arranged adjacent. FIG. 5 is a schematic view of assistance in explaining the detection surface of such a touch pad 22, and depicts a part of a cross-sectional shape of the manipulation device 20 when viewed from a front direction (on the user side). In the figure, X1 indicates the detection surface of the touch pad 22, X2 indicates the upper surface of the manipulation button 24R arranged adjacent to the right side of the touch pad 22, and X3 indicates the upper surface of the manipulation button 24L arranged adjacent to the left side of the touch pad 22 respectively. In the figure, the position of X1 is higher than that of each X2 and X3 in side surface view. In the main screen image mode, it is supposed that the user performs the game manipulation with which he/she depresses the manipulation buttons 24R and 24L, and the like by using his/her thumbs. In the case where the sub-screen image mode starting manipulation for the touch pad 22 is desired to be performed by shifting the thumb placed in the position of the manipulation button 24R or 24L to the lateral direction in such a manner, if the detection surface of the touch pad 22 is located in a high position, then, the slide manipulation with the outer edge of the detection surface as the starting point can be reliably performed.

The sub-screen image mode starting manipulation is not limited to the flick manipulation with the outer edge of the touch pad 22 as the starting point described so far, but may be various kinds of manipulations. For example, the manipulation receiving section 52 may receive the flick manipulation, the slide manipulation or the like within the area, directed to the back surface side of the manipulation device 20, of the detection area of the touch pad 22, as the sub-screen image mode starting manipulation. The manipulation for the partial area of the touch pad 22 is received as the sub-screen image mode starting manipulation in such a manner, resulting in that the sub-screen image mode starting manipulation can be received without disturbing the game manipulation for the touch pad 22. In addition, the sub-screen image mode starting manipulation may include the manipulation for the manipulation member, other than the touch pad 22, such as the manipulation with which the function button 23 is depressed, the simultaneous manipulation with which while the function button 23 is depressed, at the same time, another predetermined manipulation member is manipulated. It is to be noted that, in this case, it is supposed that the function button 23 is not used in the game manipulation.

Figure 6:
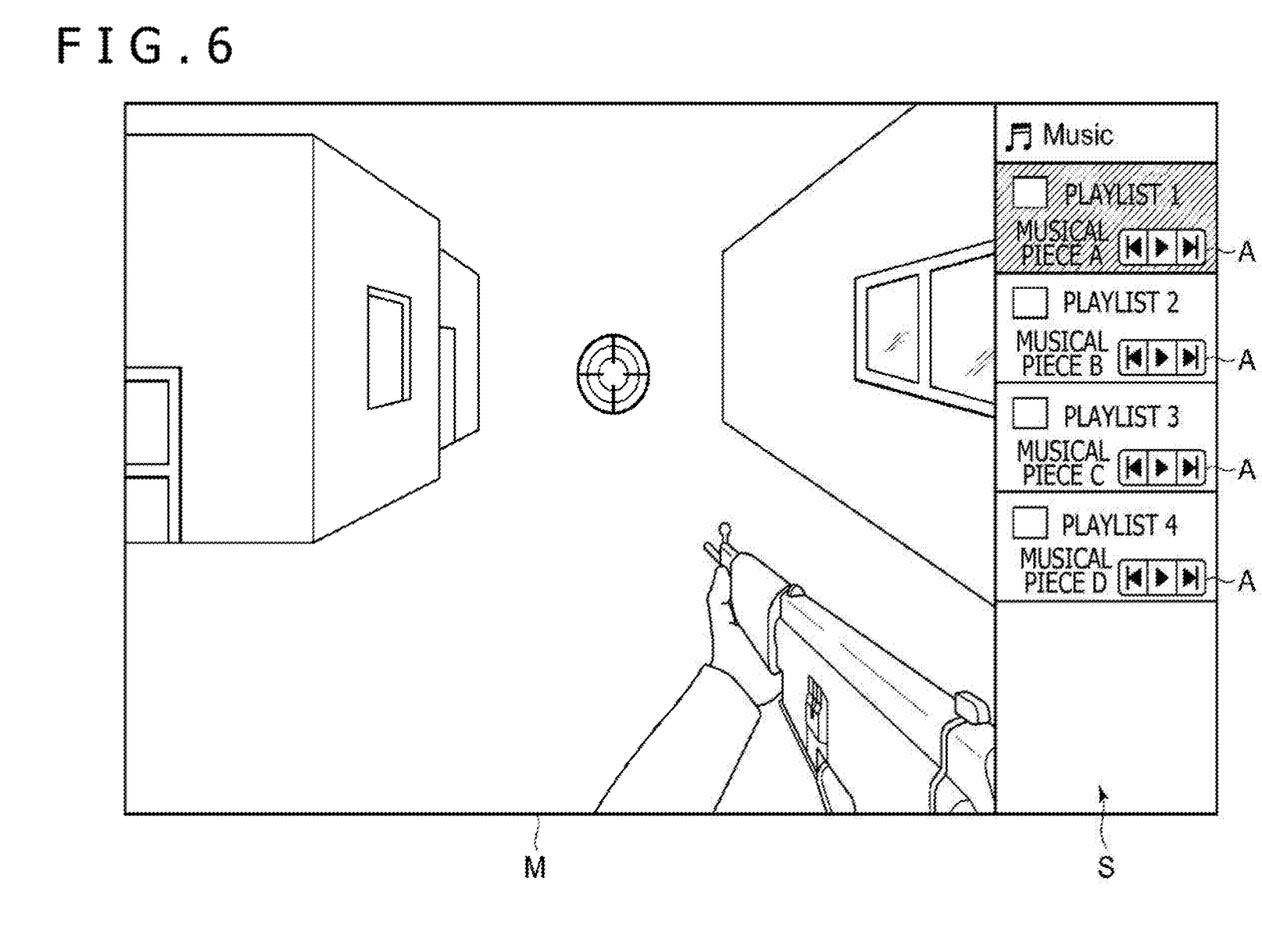
FIG. 6 is a view depicting an example of a sub-screen image.

When the manipulation receiving section 52 notifies the sub-program executing section 53 of the effect that the sub-screen image mode starting manipulation has been received, the sub-program executing section 53 starts to display the sub-screen image S. At this time, although the sub-program executing section 53 may display the sub-screen image S in a previously determined position, the sub-program executing section 53 may determine the display position of the sub-screen image S according to the position of the starting point of the sub-screen image mode starting manipulation. FIG. 6 depicts an example of the sub-screen image S which is displayed so as to be superimposed on the main screen image M, and depicts an example in which a selection menu of a playlist (a group including a plurality of reproducible musical pieces) is included within the sub-screen image S. In this case, as depicted in FIG. 4, the flick manipulation performed toward the left direction with the right side of the touch pad 22 as the starting point shall be received. In the example of FIG. 6, the sub-program executing section 53 displays the sub-screen image S along the side of the main screen image M (the right side in this case) in the same direction as the side becoming the starting point of the sub-screen image mode starting manipulation. In this example, in the case where the sub-screen image mode starting manipulation with the left side of the touch pad 22 as the starting point is performed, the sub-screen image S shall be displayed along the left side of the main screen image M. The sub-screen image S is displayed along the side corresponding to the starting point of the sub-screen image mode starting manipulation, whereby the user can intuitively grasp that the sub-screen image S is displayed by the manipulation performed by the user himself/herself. At the time of start of the display of the sub-screen image S, the sub-program executing section 53 may ring a predetermined sound from a speaker connected to the information processing apparatus 10, or vibrate a vibrating mechanism built in the manipulation device 20 to notify the user of the effect that the switching over to the sub-screen image mode is performed.

Incidentally, when the display of the sub-screen image S is started, an animation such as the sub-screen image S which gradually slides in the right direction to move from the outside of the left side of the main screen image M to enter the main screen image M may be displayed. Since the movement direction of the sub-screen image S becomes the same as that of the flick manipulation by the user, it becomes easier for the user to grasp that the sub-screen image S is displayed by his/her manipulation.

In addition, the sub-program executing section 53 may also change the contents displayed in the sub-screen image S according to the direction of the manipulation of switching over to the sub-pixel mode. For example, in the case where the flick manipulation with the right side of the touch pad 22 as the starting point is received, the sub-program executing section 53 shall, as depicted in FIG. 6, display the sub-screen image S including the display menu of the playlist along the right side of the main screen image M. In the case where the flick manipulation with the left side of the touch pad 22 as the starting point is received, the sub-program executing section 53 shall display the sub-screen image S including another kind of information such as a chat screen image along the left side of the main screen image M. In this way, then, a plurality of kinds of sub-screen images S can be displayed according to the instruction by the user. Incidentally, the sub-program executing section 53 may previously receive the designation from the user as to what kind of information is allocated to what side of the outer edge of the touch pad 22. In this way, then, the user can cause the sub-screen image S of the kind which he/she desires to be displayed in an arbitrary position.

Next, a description will be given with respect to a concrete example of the manipulation for the touch pad 22 in the sub-screen image mode.

In the case where the sub-screen image S including a plurality of menu items is displayed, the user performs the flick manipulation for the touch pad 22, thereby enabling a desired menu item to be selected. In an example of FIG. 6, a plurality of menu items is vertically arranged side by side along the right side of the main screen image M. In this case, every time the flick manipulation performed in the upward direction or in the downward direction is received from the user, the sub-program executing section 53 switches the menu item being selected over to the adjacent next menu item in the instructed direction. The user performs the tap manipulation or the click manipulation for the touch pad 22 in a state in which he/she selects the desired menu item, thereby enabling the execution of the function allocated to the menu being selected to be instructed.

Further, a manipulation target area A including a plurality of selection target objects (hereinafter, referred to as buttons) which can be selected by the user may be arranged in the inside of each of the menu items. In FIG. 6, the playlists are vertically arranged side by side as the menu items, and moreover, the manipulation target area A including a plurality of buttons indicating the contents of the instruction to the corresponding playlist is arranged in each of the individual menu items. The functions such as the start of reproduction of a musical piece, the advancing to one next musical piece, and the returning back to the one before the musical piece are allocated to the plurality of buttons. Incidentally, in this case, the buttons within each of the menu items are arranged side by side along the horizontal direction (i.e., a direction to intersect with the arrangement direction of the menu items) within the manipulation target area A.

The user can select the buttons within the manipulation target area A by a combination of the tap manipulation or the slide manipulation, and the click manipulation. Specifically, the manipulation target area A is made to correspond to a rectangular detection area of the touch pad 22. In the case where three buttons B1, B2, and B3 are arranged from the left within the manipulation target area A, the areas which are obtained by horizontally dividing the touch pad 22 into three parts are made to correspond to these buttons, respectively. In other words, in the case where the user performs the click manipulation with which he/she taps the one-third area on the left side of the touch pad 22 and continuously compresses the whole detection area without releasing his/her finger, the button B1 is selected. In addition, in the case where the user taps the one-third area at the center of the touch pad 22 to perform the click manipulation, the button B2 is selected. In the case where the user taps the one-third area on the right side of the touch pad 22 to perform the click manipulation, the button B3 is selected. The user performs the click manipulation with which he/she causes his/her finger to contact the area corresponding to the desired button within the touch pad 22, and compresses the whole touch pad 22, whereby the user can select the button of interest.

In general, however, since it is supposed that the user performs the manipulation while viewing the screen image on the display apparatus 30 without looking at the manipulation device 20 in hand, it is difficult for the user to accurately tap the desired position within the touch pad 22. Then, after the user performs the slide manipulation with which his/her finger is moved from the position where he/she caused his/her finger to contact at first to the position corresponding to the desired button, he/she may continuously perform the click manipulation without releasing his/her finger. In the case where the slide manipulation with which the button within the manipulation target area A is selected is received, the sub-program executing section 53 executes the processing made to correspond to the button displayed in the position within the manipulation target area A corresponding to the position of the end point of the slide manipulation (in this case, the position when the clock manipulation is performed). Then, in order to enable the user to easily perform such a slide manipulation, while the slide manipulation is performed, the sub-program executing section 53 may perform feedback display indicating the position within the manipulation target area A corresponding to the position of the finger of the user that is moving.

Figure 7:
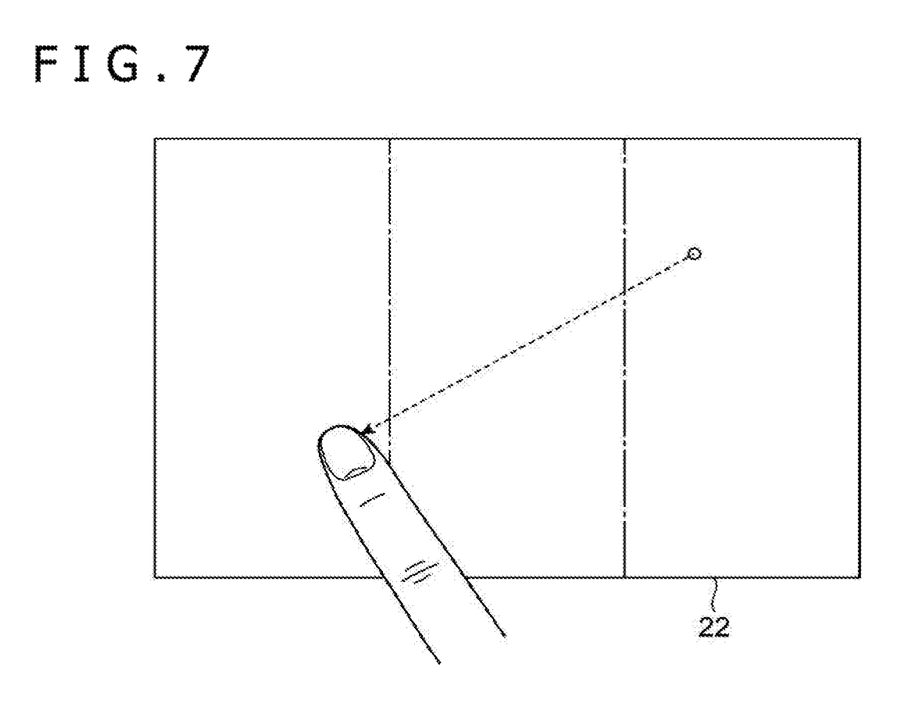
FIG. 7 is a view depicting an example of a manipulation with which a selection target object is selected.
Figure 8A:
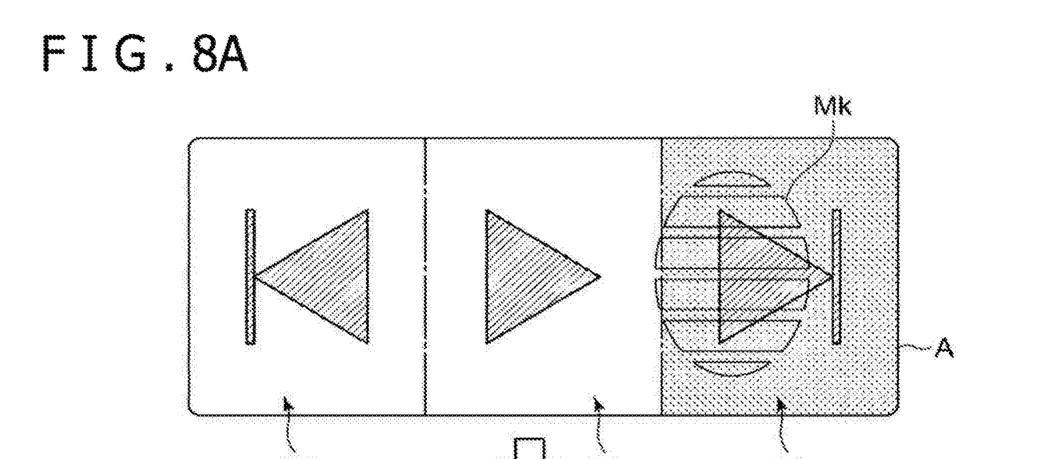
FIGS. 8A and 8B are views depicting an example of a marker displayed within a manipulation target area.
Figure 8B:
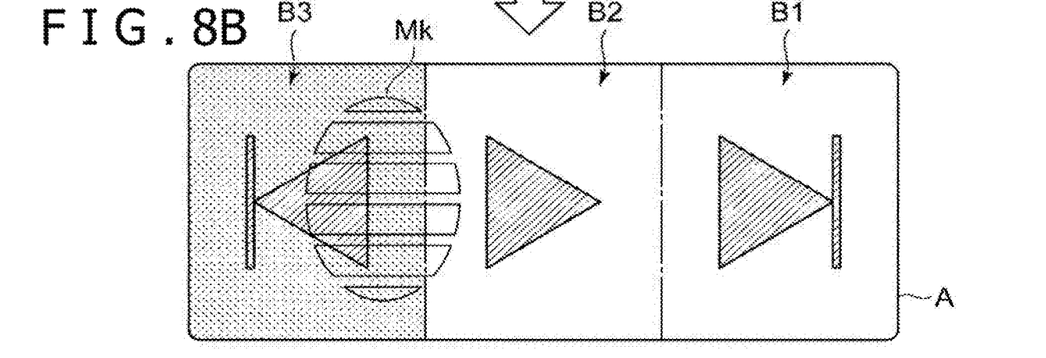

FIG. 7 is a view depicting the contents of the selection manipulation for the button in this example. In addition, FIGS. 8A and 8B are views depicting feedback display at the time of the manipulation start and at the time of the manipulation end, and is a partial enlarged view of the manipulation target area A. It is to be noted that FIG. 8A depicts a situation at the time of the manipulation start, and FIG. 8B depicts a situation at the time of the manipulation end. As depicted in FIG. 7, in this example, the user firstly causes his/her finger to touch within one-third area on the right side of the touch pad 22. At this time, as depicted in FIG. 8A, a marker Mk indicating a position within the manipulation target area A corresponding to the contact position is displayed. In this state, when the user performs the slide manipulation with his/her finger contacting the touch pad 22, the marker Mk moves within the manipulation target area A in response to the motion of the finger. When, as depicted in FIG. 8B, the marker Mk moves to within the button which the user himself/herself desires to select, the user performs the click manipulation. Thereby, the user can select the desired button (in this case, the button B3 on the left side).

It is to be noted that since in the example of FIGS. 8A and 8B, a plurality of buttons is arranged side by side along the horizontal direction within the manipulation target area A, the sub-program executing section 53 shall move the marker Mk only in the horizontal direction (in the arrangement direction of the button), and shall not change the position in the vertical direction. However, the sub-program executing section 53 may reflect the position of his/her finger to vertically move the marker Mk. In addition, the button which the user desires to select may be displayed by highlight-displaying the button corresponding to the current contact position of the finger of the user, and so on, instead of displaying the marker Mk, or in addition to the display of the marker Mk. In the example of FIGS. 8A and 8B, it is indicated by the hatching that the color of the button which is selected along with the movement of the marker Mk is charged.

In addition, in the case where the feedback display is performed in such a manner, the areas within the touch pad 22 corresponding to the buttons, respectively, are not necessarily equal in size to one another and do not necessarily correspond to the sizes of the buttons displayed in the screen image. Specifically, the sub-program executing section 53 may determine the allocation of the areas corresponding to the buttons, respectively, according to the position where the user causes his/her finger to contact at first when the user performs the selection manipulation for the button. As an example, in the case where the user starts to perform the slide manipulation with the position near the right side within the touch pad 22 as the starting point, the area within the touch pad 22 corresponding to the button near the right side is made relatively small, and the area within the touch pad 22 corresponding to the button near the left side is made relatively large. In this way, then, even in the case where the position where the user causes his/her finger to contact at first when he/she starts to perform the slide manipulation does not lie in the area corresponding to the button which the user desires to select, the user can select the desired button by performing the slide manipulation for the relative short movement distance. Then, even if the sizes of the areas within the touch pad 22 corresponding to the buttons are different from one another, or are derived from the sizes of the buttons displayed in the screen image, the feedback display by the marker Mk is performed, resulting in that the user can select the desired button without feeling uncomfortable.

Figure 9:
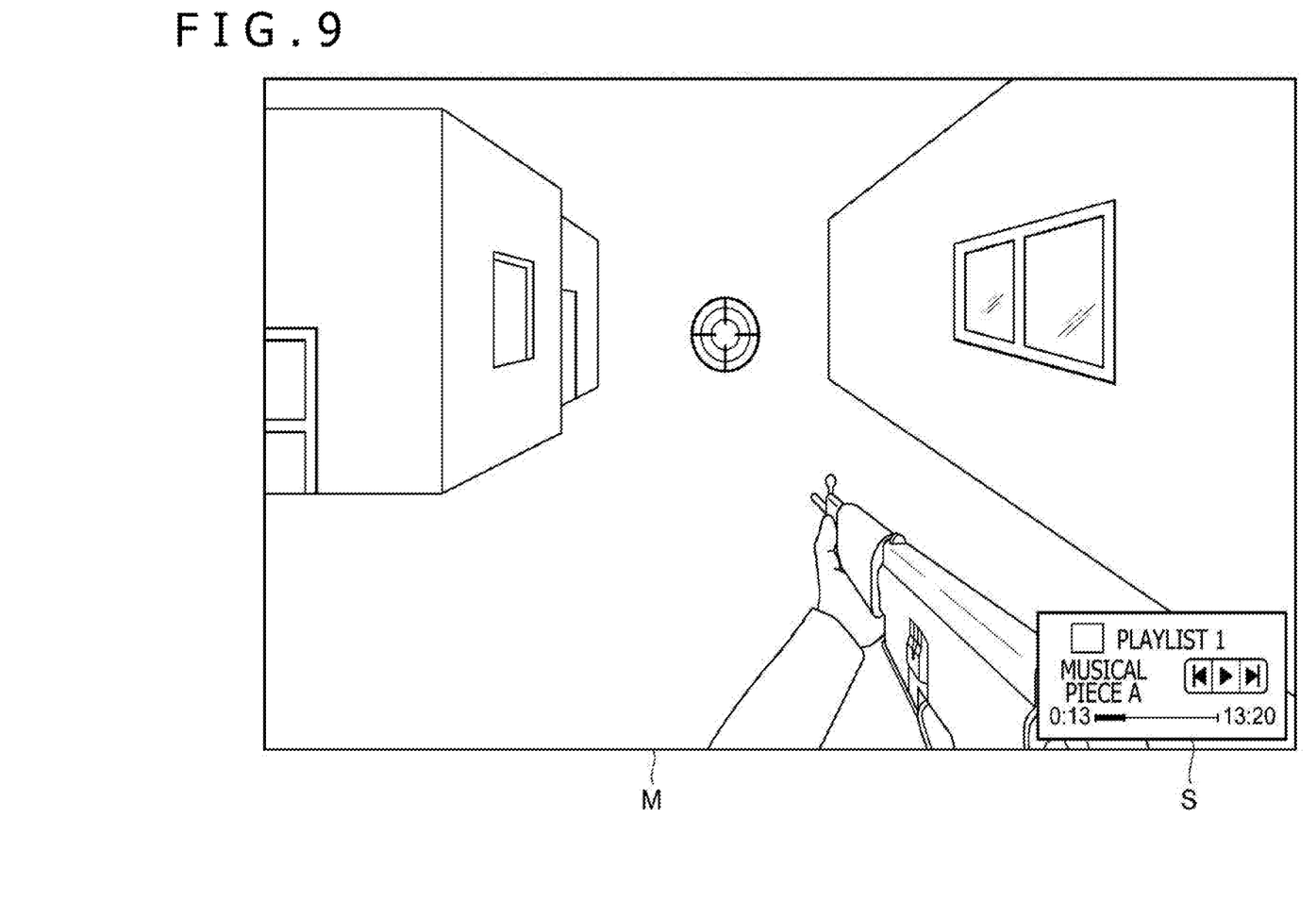
FIG. 9 is a view depicting an example of a reduced sub-screen image.

The sub-program executing section 53 may change the size of the sub-screen image S in response to the manipulation for the touch pad 22 by the user. As an example, in the case where the user performs the slide manipulation or the flick manipulation in the previously determined direction, the sub-program executing section 53 changes the size of the sub-screen image S to the relatively small size with which only the menu item being selected at that time is displayed. FIG. 9 depicts a display example in this case. Only the playlist which was being selected before the size change is displayed in the sub-screen image S, and further the information associated with the playlist being selected is additionally displayed in the sub-screen image S compared with the sub-screen image S before the size change in which a plurality of playlists was displayed. Even in this state, similarly to the case where the plurality of playlists was displayed side by side as the menu items, the manipulation with which the selection target object within the manipulation target area A is selected with the slide manipulation, the click manipulation, and the like can be received. In addition, a manipulation with which the menu item being displayed is switched over to another menu item with the flick manipulation may be received.

Such a manipulation with which the size is changed may be received with the manipulation using a plurality of fingers. Specifically, in the case where, in a state in which such a sub-screen image S as to be exemplified in FIG. 6 or FIG. 9 is displayed, a pinch-in manipulation with which two fingers are slid so as to be brought close to each other is received, the sub-program executing section 53 may reduce the size of the sub-screen image S. In addition, in the case where a pinch-out manipulation with which the two fingers are slid so as to separate the two fingers away from each other is received, the sub-program executing section 53 may enlarge the size of the sub-screen image S or may return the size of the reduced sub-screen image S back to original one. Moreover, in the case where a slide manipulation with which the two fingers are slid in the same direction is received, the width of the sub-screen image S may be widened or reduced.

In addition, the manipulation with which the size is changed may also be the flick manipulation, with the outer edge of the touch pad 22 as the starting point, which is performed by using a plurality of fingers. As an example, in the case where the two flick manipulations which are moved inward with the left side and the right side of the touch pad 22 as the starting points, respectively, are received around the same time, the sub-program executing section 53 may perform the control which reduces the size of the sub-screen image S, such as the transition made from the sub-screen image S exemplified in FIG. 6 to the sub-screen image S exemplified in FIG. 9. In this example, in the case where the two flick manipulations performed around the same time by the two fingers which are moved from the inside of the touch pad 22 toward the outer edges (in this case, the left side and the right side) are received, the sub-program executing section 53 shall return the size of the sub-screen image S back to the original one.

Figure 10:
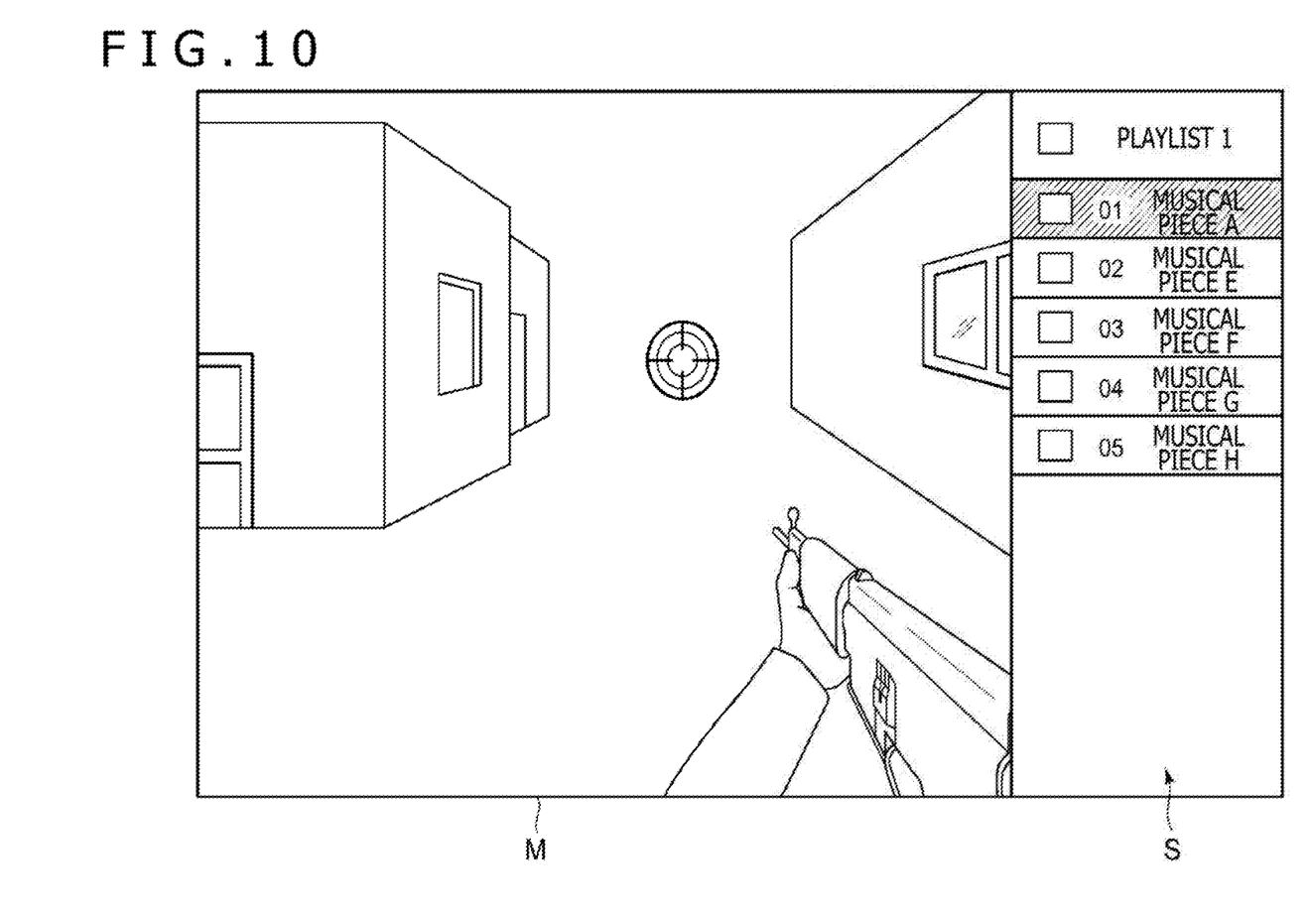
FIG. 10 is a view depicting an example of a sub-screen image including a menu item of a hierarchy at a lower level.

The sub-program executing section 53 may hierarchically switch the menu item over to another menu item and may display another menu item in response to the flick manipulation by the user. For example, in the case where, as depicted in FIG. 6, the sub-screen image S is displayed in response to the sub-screen image mode starting manipulation directed to the left direction of the user, the menu item of the lower hierarchy by one level than the menu item being currently selected is further displayed in response to the flick manipulation in the same left direction. FIG. 10 depicts an example in which the menu item of the lower hierarchy is displayed in such a manner. In this case, there is displayed a list of musical pieces belonging to the playlist selected in the upper hierarchy. In the case where, in this state, the flick manipulation in the right direction is received, the sub-program executing section 53, as depicted in FIG. 6, displays the menu item of the upper hierarchy by one level than the previous one again.

Next, a description will be given with respect to a manipulation with which the sub-screen image mode is ended (hereinafter, referred to as a sub-screen image mode ending manipulation). In the case where the sub-screen image mode starting manipulation is the flick manipulation with the outer edge of the touch pad 22 as the starting point, the sub-screen image mode ending manipulation may be a flick manipulation in a direction reverse to that of the sub-screen image mode starting manipulation. In this case, when in the state in which the sub-screen image S is displayed, the flick manipulation in a direction reverse to that of the sub-screen image mode displaying manipulation is received, the sub-program executing section 53 ends the display of the sub-screen image S, and the manipulation receiving section 52 proceeds from the sub-screen image mode to the main screen image mode. At this time as well, similarly to the case where the display of the sub-screen image S is started, the animation in which the sub-screen image S slides to move in a direction corresponding to the direction of the flick manipulation to be framed out to the outside of the main screen image M may be displayed. It is to be noted that the flick manipulation with which the display of the sub-screen image S is instructed to be ended, unlike the sub-screen image mode starting manipulation, is not necessarily performed with the outer edge of the touch pad 22 as the ending point. The reason for this is because in the sub-screen image mode, all the manipulations for the touch pad 22 are received as the manipulations for the sub-screen image S. However, only the flick manipulation with the side opposite to the side becoming the starting point of the sub-screen image mode starting manipulation as the starting point may be received by the sub-screen image mode ending manipulation.

Incidentally, in the case where, as described above, the transition is made to the hierarchy at the lower level by the flick manipulation in the same direction as that of the sub-screen image mode starting manipulation, the flick manipulation in the direction reverse to that direction is allocated to the transition made to the hierarchy at the upper level. In this case, in the case where, in the state in which the hierarchy at the top level is displayed (i.e., returning back to the hierarchy in the state in which at first, the display of the sub-screen image S is started), the flick manipulation in the reverse direction is further received, the display of the sub-screen image S shall be ended.

In addition, the sub-screen image mode ending manipulation is not limited to the manipulation for the touch pad 22 similarly to the sub-screen image mode starting manipulation, and may, for example, be a depressing manipulation for the function button 23, or the like.

In the above description, in the main screen image mode, the sub-screen image S shall not be displayed on the display apparatus 30, but only during the sub-screen image mode in which the manipulation for the sub-screen image S can be received, the sub-screen image S shall be displayed. However, not limited to this, even while in the main screen image mode, the game manipulation by the user is received, similarly to the case of the sub-screen image mode, the sub-screen image S may be displayed together with the main screen image M. In this case, although until the sub-screen image mode starting manipulation is performed, it may be impossible for the user to perform the manipulation for the sub-screen image S, he/she can play the game being displayed in the main screen image M while browsing the displayed contents of the sub-screen image S.

In the case where, even after the sub-screen image mode is ended, the user desires to continue to display the sub-screen image S, he/she shall perform a given manipulation (in this case, referred to as a pinning manipulation) in the sub-screen image mode. This manipulation may, for example, be a manipulation with which the size of the sub-screen image S as described above is reduced. In this example, in the case where the manipulation with which the size of the sub-screen image S is reduced is received as the pinning manipulation, the sub-program executing section 53 makes the transition to a state in which the sub-screen image S is reduced and displayed and the sub-screen image S is caused to continue to be displayed (hereinafter, a pinning state). In conjunction with the transition, the transition to the main screen image mode shall be made, and in and after the transition, the manipulation receiving section 52 shall output the manipulation for the touch pad 22 to the main program executing section 51. Hereby, while the user plays the game by browsing the main screen image M as usual, he/she can browse the sub-screen image S around the same time. When in the pinning state, the user performs the sub-screen image mode starting manipulation, the manipulation receiving section 52 shall make the transition to the sub-screen image mode, and in and after the transition, the manipulation receiving section 52 shall output the manipulation for the touch pad 22 to the sub-program executing section 53. If the transition is made to the sub-screen image mode, then, as has been described so far, the user can perform the various kinds of manipulations for the sub-screen image S by using the touch pad 22. In addition, in the case where in the sub-screen image mode, the sub-screen image mode ending manipulation is received from the user, the transition to the main screen image mode is made again, the manipulation for the touch pad 22 shall be outputted to the main program executing section 51 with the sub-pixel S being displayed. On the other hand, in the case where in the sub-screen image mode, a given manipulation different from the sub-screen image mode ending manipulation is received, the manipulation receiving section 52 may perform the proceeding to the main screen image mode, and the sub-program executing section 53 may end the display of the sub-screen image S. In this case, the pinning state of the sub-screen image S is released. It is to be noted that even in the state in which the pinning state is released and the sub-screen image S is not displayed on the display apparatus 30, the sub-program executing section 53 may continue to execute the sub-program in the background.

In the case where the proceeding to the main screen image mode is performed in the pinning state, although the sub-screen image S is displayed, the manipulation for the sub-screen image S shall not be received. Then, the sub-program executing section 53 may change a display form of the sub-screen image S according to the current mode, such as changing the background color and so on, so that the user can distinguish a state in which the manipulation for the sub-screen image S can be received (sub-screen image mode) and a state in which it may be impossible to receive the manipulation for the sub-screen image S (main screen image mode) from each other. Moreover, when the proceeding to the sub-screen image mode is performed, so that a state in which the manipulation for the sub-screen image S can be received is obtained, a light emission section (not depicted) provided within or in the vicinity of the touch pad 22 of the manipulation device 20 is caused to emit light and so on, so that the current mode may be displayed on the side of the manipulation device 20.

As has been described so far, according to the information processing apparatus 10 pertaining to the embodiment of the present disclosure, the predetermined manipulation which is not used as the manipulation for the main program is received as the manipulation to proceed to the sub-screen image mode, and in the sub-screen image mode, only some manipulation members are allocated to the manipulation for the sub-screen image S, resulting in that the manipulation for the main program and the manipulation for the sub-screen image S can be made compatible with each other. In particular, the touch pad 22 which can be utilized in the instruction manipulation or determination manipulation in the arbitrary direction is allocated to the manipulation for the sub-screen image S, thereby enabling the manipulation for the sub-screen image S to be smoothly performed.

It is to be noted that the embodiment of the present disclosure is not limited to the matter described so far. For example, the displayed contents of the sub-screen image S or the contents of the manipulation for the sub-screen image S in the above description are each merely exemplifications. Moreover, although in the above description, in the sub-screen image mode, the touch pad 22 shall be allocated to the manipulation for the sub-screen image S, instead of this or in addition to this, another manipulation member (such as the manipulation button 24L or the analog stick 25L) may be allocated to the manipulation for the sub-screen image S.

Moreover, although in the above description, the sub-program executing section 53 displays the sub-screen image S so as for the sub-screen image S to be superimposed on the main screen image M, the sub-screen image S may be displayed together with the main screen image M in another form and, for example, the main screen image M and the sub-screen image S may be displayed side by side in a blank area obtained by reducing the main screen image M.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus connected to a manipulation device including a plurality of manipulation members, the information processing apparatus comprising:
   a main program executing section executing a main program to display a main screen image showing main program actions of a user in a main program application;
   a sub-program executing section executing a sub-program around the same time as the main program to display a sub-screen image together with the main screen image, the sub-program being a separate program from the main program, the sub-screen image showing sub-program actions of the user in a sub-program application; and
   a manipulation receiving section switching between a first operation mode in which manipulations by the user of the plurality of manipulation members are processed by the main program, and not the sub-program, as manipulation inputs for the main program actions of the user in the main program application, and a second operation mode in which manipulations by the user for the predetermined some manipulation members are processed by the sub-program, and not the main program, as manipulation inputs for the sub-program actions of the user in the sub-program application, wherein:

the plurality of manipulation members includes a touch pad detecting a position of an object on a detection area, and at least one manipulation button, and the predetermined some manipulation members include the touch pad but not the at least one manipulation button, the manipulation receiving section switches from the first operation mode to the second operation mode upon receipt of at least one specific movement of an object on the touch pad, and in the second operation mode, the main program continues to operate in response to manipulations by the user of the at least one manipulation button, but not in response to the touch pad, and the sub-program simultaneously operates in response to the touch pad, but not in response to the at least one manipulation button.

2. The information processing apparatus according to claim 1, wherein the at least one specific manipulation includes a predetermined starting manipulation, which is different from any of the manipulations for the main program is received, the sub-program executing section starts to display the sub-screen image.

3. The information processing apparatus according to claim 2, wherein the predetermined starting manipulation includes a manipulation where the object is moved with an outer edge of the detection area of the touch pad as a starting point.

4. The information processing apparatus according to claim 1, wherein a manipulation target area including a plurality of selection target object is included in the sub-screen image, and in a case where a movement manipulation with which the object is moved on the touch pad is received, the sub-program executing section executes processing made to correspond to, of the plurality of selection target object, a selection target object displayed in a position within the manipulation target area corresponding to a position of an end point of the movement.

5. The information processing apparatus according to claim 4, wherein while the movement manipulation for the manipulation target area is performed, the sub-program executing section performs display indicating a position within the manipulation target area corresponding to a position of the object that is moving.

6. An information processing method executed by a computer connected to a manipulation device including a plurality of manipulation members, the information processing method comprising:

executing a main program to display a main screen image showing main program actions of a user in a main program application;

executing a sub-program around the same time as the main program to display a sub-screen image together with the main screen image, the sub-program being a separate program from the main program, the sub-screen image showing sub-program actions of the user in a sub-program application; and switching between a first operation mode in which manipulations by the user for of the plurality of manipulation members are processed by the main program, and not the sub-program, as manipulation inputs for the main program actions of the user in the main program application, and a second operation mode in which manipulations by the user for the predetermined some manipulation members are processed by the sub-program, and not the main program, as manipulation inputs for the sub-program actions of the user in the sub-program application, wherein:

the plurality of manipulation members includes a touch pad detecting a position of an object on a detection area, and at least one manipulation button, and the predetermined some manipulation members include the touch pad but not the at least one manipulation button, the manipulation receiving section switches from the first operation mode to the second operation mode upon receipt of at least one specific movement of an object on the touch pad, and in the second operation mode, the main program continues to operate in response to manipulations by the user of the at least one manipulation button, but not in response to the touch pad, and the sub-program simultaneously operates in response to the touch pad, but not in response to the at least one manipulation button.

7. A non-transitory, computer readable storage medium containing a program, which when executed by a computer, which is connected to a manipulation device including a plurality of manipulation members, causes the computer to perform an information processing method by carrying out actions, comprising:

executing a main program to display a main screen image showing main program actions of a user in a main program application;

executing a sub-program around the same time as the main program to display a sub-screen image together with the main screen image, the sub-program being a separate program from the main program, the sub-screen image showing sub-program actions of the user in a sub-program application; and switching between a first operation mode in which manipulations by the user of the plurality of manipulation members are processed by the main program, and not the sub-program, as manipulation inputs for the main program actions of the user in the main program application, and a second operation mode in which manipulations by the user for predetermined some manipulation members are processed by the sub-program, and not the main program, as manipulation inputs for the sub-program actions of the user in the sub-program application, wherein:

the plurality of manipulation members includes a touch pad detecting a position of an object on a detection area, and at least one manipulation button, and the predetermined some manipulation members include the touch pad but not the at least one manipulation button, the manipulation receiving section switches from the first operation mode to the second operation mode upon receipt of at least one specific movement of an object on the touch pad, and in the second operation mode, the main program continues to operate in response to manipulations by the user of the at least one manipulation button, but not in response to the touch pad, and the sub-program simultaneously operates in response to the touch pad, but not in response to the at least one manipulation button.

\* \* \* \* \*